United States Patent [19]
Diorio et al.

[11] Patent Number: 5,722,201
[45] Date of Patent: Mar. 3, 1998

[54] SYSTEM FOR SUPPORTING AND IRRIGATING PLANT POTS

[76] Inventors: James J. Diorio, S.3 W.31963 Mary Ct., Delafield, Wis. 53018; Robert P. Hubbell, 13210 W. Marquette Dr., New Berlin, Wis. 53151

[21] Appl. No.: 532,172

[22] Filed: Sep. 22, 1995

[51] Int. Cl.$^6$ .................................................. A01G 31/02
[52] U.S. Cl. .................... 47/81; 47/79; 47/66.7
[58] Field of Search ........................... 47/81 S, 81 N, 47/79 R, 79 N, 1.01, 75 N, 66.7

[56] References Cited

U.S. PATENT DOCUMENTS

| | | | |
|---|---|---|---|
| 3,958,424 | 5/1976 | Cotton | 47/79 R |
| 4,965,963 | 10/1990 | Lyon | 47/81 |
| 5,379,518 | 1/1995 | Peterson | 47/81 |

FOREIGN PATENT DOCUMENTS 102887  10/1898  Germany .......................... 47/71

*Primary Examiner*—Henry E. Raduazo

[57] ABSTRACT

An apparatus for supporting and irrigating a plant pot having a bottom and a side wall for holding a soil-based live plant comprises a container having a bottom and at least one side wall for retaining liquid, a free-standing support disposed between the container and the plant pot and a wick extending between the free-standing support and the plant pot to transfer liquid by capillary action to the plant pot. The free-standing support is formed by a singular, generally rectangular strip of flexible, curlable material constructed and arranged to define a spiral platform which self adjusts to the size of the container.

15 Claims, 9 Drawing Sheets

SYSTEM FOR SUPPORTING AND IRRIGATING PLANT POTS

FIELD OF THE INVENTION

This invention relates generally to plant irrigation and support systems, and more particularly, pertains to an irrigation system operative by capillary action and a support system interposed between a plant pot and a container serving as a reservoir.

BACKGROUND OF THE INVENTION

Plant irrigation systems are designed to provide moisture to potted plants with a minimum of maintenance involved. Such plant irrigation systems typically contain an external decorative container which acts as a reservoir, an internal planter pot which holds the soil and a live plant, and a support platform placed between the container and planter pot to prevent the pot from resting in the water. A wick is inserted between the reservoir and the pot to draw water up from the container by capillary action so as to irrigate the soil and plant.

Support platforms implemented in prior art plant irrigation systems have been generally inadequate for a number of reasons. For example, most support systems exhibit inferior designs which are difficult to adapt to various sized containers. Other systems must be assembled such as by folding and interlocking components of the support elements. One example of such a system is disclosed in U.S. Pat. No. 5,379,548 issued Jan. 10, 1995 to Peterson. Another similar design is shown in U.S. Pat. No. 4,965,963 issued Oct. 30, 1990 to Lyon. This system suffers additionally from the use of corrugated or irregularly surfaced materials which inhibits cleaning and results in foul odor from bacterial breakdown. Furthermore, systems such as Lyon's do not always provide the necessary support required by a particularly sized pot. Some prior art systems fail to the provide the proper for monitoring water levels in the reservoir.

Such predecessor systems have not proved to be entirely effective and convenient to use and it remains desirable to provide a reusable support and irrigating system which is extremely durable yet easy to install, self adjusts to the container size, is incrementally adjusted for varying loads, requires no assembly and generally avoids the problems of the prior art systems discussed above. It is also desirable to provide a system which is compact and lightweight, which reduces shipping and handling costs, and which is easily maintained.

SUMMARY OF THE INVENTION

The inventive system for supporting and irrigating plant pots advantageously provides a relatively simple, yet stronger and sturdier support platform characterized by its self adjusting and easily packaged features.

These and other aspects of the invention are realized in an apparatus for supporting and irrigating a plant pot having a bottom and a side wall for holding a soil-based live plant. A container has a bottom, and at least one side wall for retaining a liquid. A free standing support is formed by a singular, generally rectangular strip of flexible, curlable material constructed and arranged to define a spiral platform disposed within the bottom and side wall of the container and lying between the bottom of the container and the bottom of the plant pot. The strip has an inner end and an outer end and the spiral platform creates a circular pathway emanating from an open center site adjacent the inner end of the strip and flowing past an outlet site adjacent the outer end of the strip. The outer end of the strip is engagable against the bottom and the side wall of the container. A wick extends from the pathway to transfer liquid by capillary action to the plant pot when the container is filled with liquid.

In another aspect of the invention, there is contemplated a free standing support for a plant pot having an open top, a bottom and a side wall. A singular, generally rectangular, elongated strip of flexible, curlable material has an upper linear edge, a lower linear edge substantially parallel to the upper linear edge, a first end, a second end substantially parallel to the first end, an inner face and an outer face. The strip is constructed and arranged to define a spiral platform capable of supporting the bottom of the plant pot on the upper linear edge of the strip.

In yet another aspect of the invention, a method for supporting and irrigating a plant pot having a bottom and a side wall for holding a soil-based plant comprises the steps of a) providing a container having a bottom and at least one side wall for retaining a plant maintaining liquid; b) providing an elongated, generally rectangular strip of flexible material having an inner end and an outer end; c) heating and curling the strip to form a spiral platform of coiled construction capable of supporting a plant pot, the spiral platform creating a pathway emanating from an open center site adjacent the inner end and flowing past an outlet site adjacent the outer end of the strip; d) placing the spiral platform against the bottom and the side wall of the container, the spiral platform self adjusting to the size of the container by virtue of the coiled construction; e) placing the plant pot upon the spiral platform; f) supplying the plant maintaining liquid in the container such that the liquid is spread out along the bottom of the container and along the pathway; and g) extending a wick from the pathway to transfer the plant maintaining liquid by capillary action to the plant pot.

DETAILED DESCRIPTION OF THE PREFERRED EXEMPLARY EMBODIMENT

Figure 1:
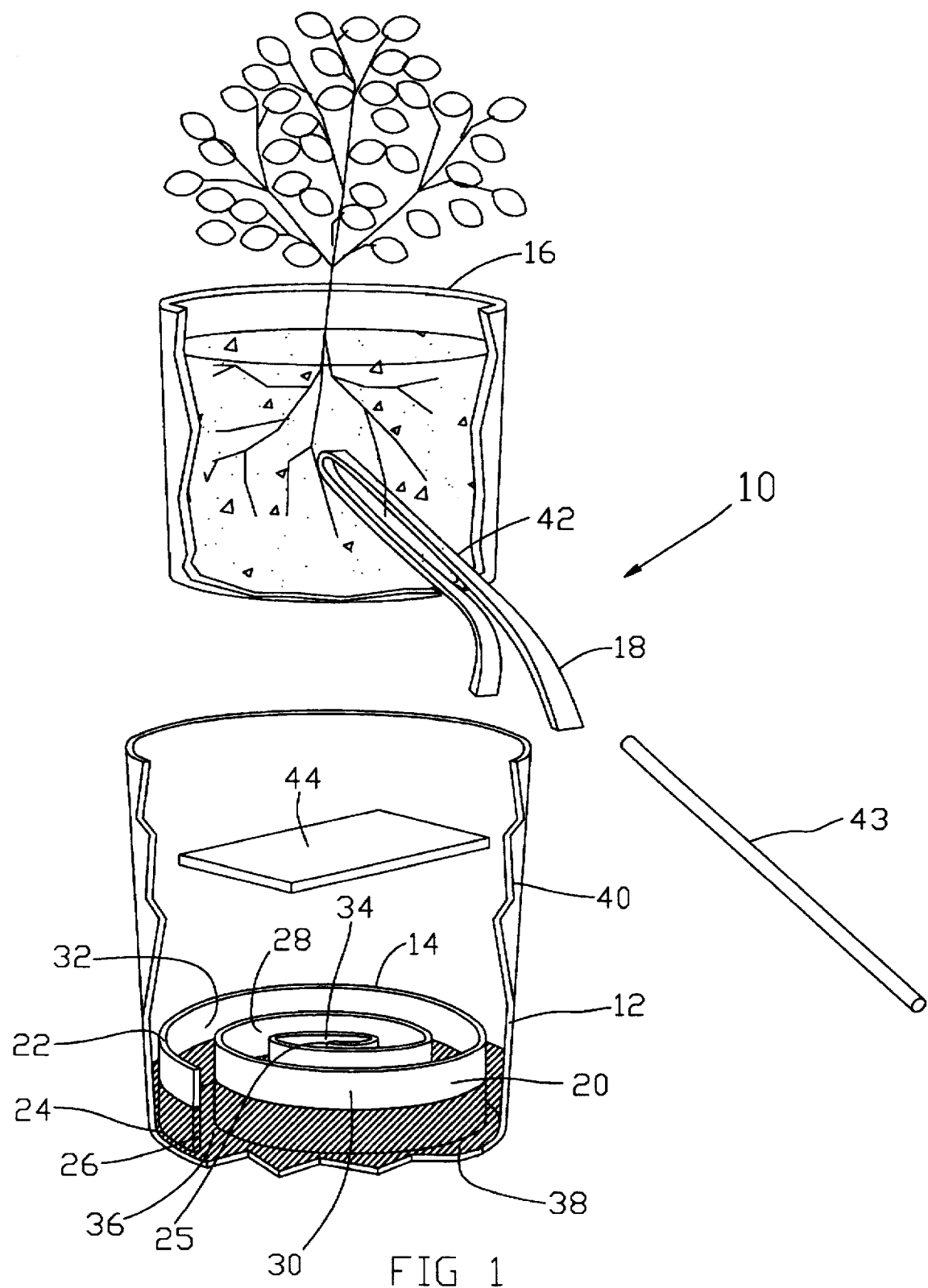
FIG. 1 is an exploded view of a plant sub-irrigation system embodying the present invention.
Figure 1A:
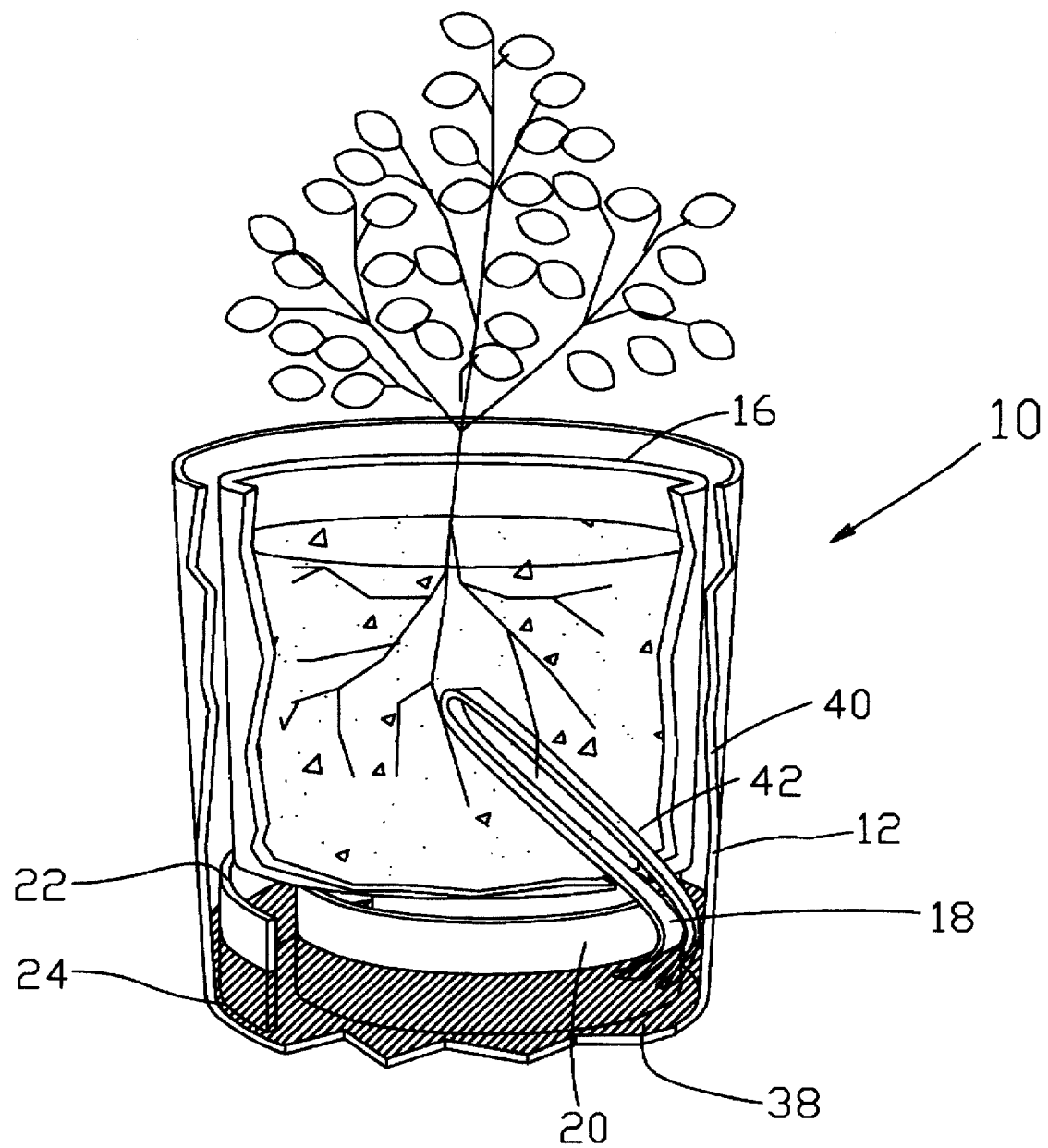
FIG. 1A is an elevational view with parts broken away showing the assembled plant sub-irrigation system.
Figure 2:
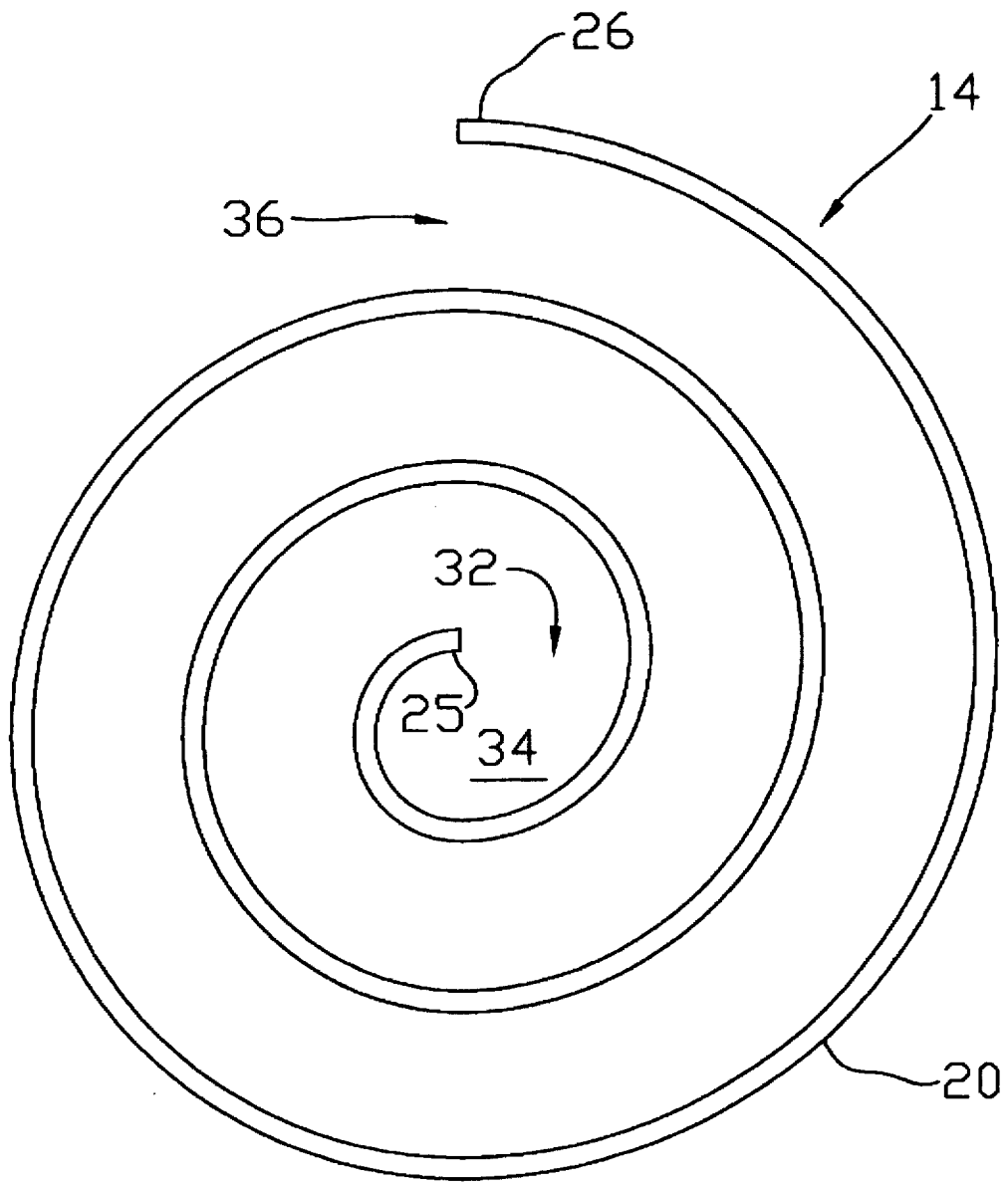
FIG. 2 is a top view of a spiral platform embodying the present invention.

Referencing now to the drawings, the system for supporting and irrigating plant pots is generally identified by the reference numeral 10 as shown in FIG. 1. System 10 is comprised of a container 12, a free-standing support 14, a plant pot 16 and a wick 18.

According to the invention, free-standing support 14 is typically formed by a singular generally rectangular strip 20 of flexible, curlable material having an elongated, upper linear edge 22 and an elongated lower linear edge 24 substantially parallel to the upper linear edge 22. Strip 20 also has a first or inner end 25, a second or outer end 26 generally parallel to the first or inner end 25, a smooth inner face 28 and a smooth outer face 30. Strip 20 is preferable constructed of a high density, liquid impervious plastic such as acronitrile butadiene styrene, polyvinyl chloride, polypropylene and polyethylene. However, strip 20 may consist of any other material that is capable of being flexed and spring loaded without fracturing such as nylon, rubber, vinyl, various impregnated, laminated fibrous and plasticized materials. In the preferred embodiment, 1) a piece of material is extruded and hot curled; 2) a flat piece of stock is curled and then the material is cut into strips; or 3) a flat sheet of stock is cut into strips then each is forced into a mold, partially melted and cooled; or 4) each strip is injection molded using a metal die and mold press. The finished product is a spring-like spiral strip or platform which creates a circular pathway 32, the radius of which continuously increases from the inner end 24 to the outer end 26. Pathway 32 thus emanates from an open center site 34 adjacent the upper end 24 and flows past an outlet site 36 adjacent the outer end 26. As will be appreciated hereafter, the spiral platform is capable of supporting the bottom of plant pot 16 on the upper linear edge 22 of strip 20.

System 10 comprises container 12 having a bottom 38 and at least one side wall 40 extending upwardly from the bottom 38 for retaining a liquid, preferably water or a water based nutrient, therein. System 10 further includes freestanding support 14 in the form of the spiral platform which rests within the bottom 38 and side wall 40 of container 12. Plant pot 16 sits on top of the free-standing support 14 in a manner such that the spiral platform is interposed between the bottom of container 12 and the bottom of plant pot 16. Wick 18 extends between a drainage opening 42 in plant pot 16 and the pathway 32 formed by the strip 20. As is the normal practice, a reservoir of liquid which is retained within the bottom 38 of container 12 fills the area of the pathway 32. Capillary action transfers liquid through the wick 18 from the pathway 32 to plant pot 16 when container 12 has been filled with liquid.

Figure 3:
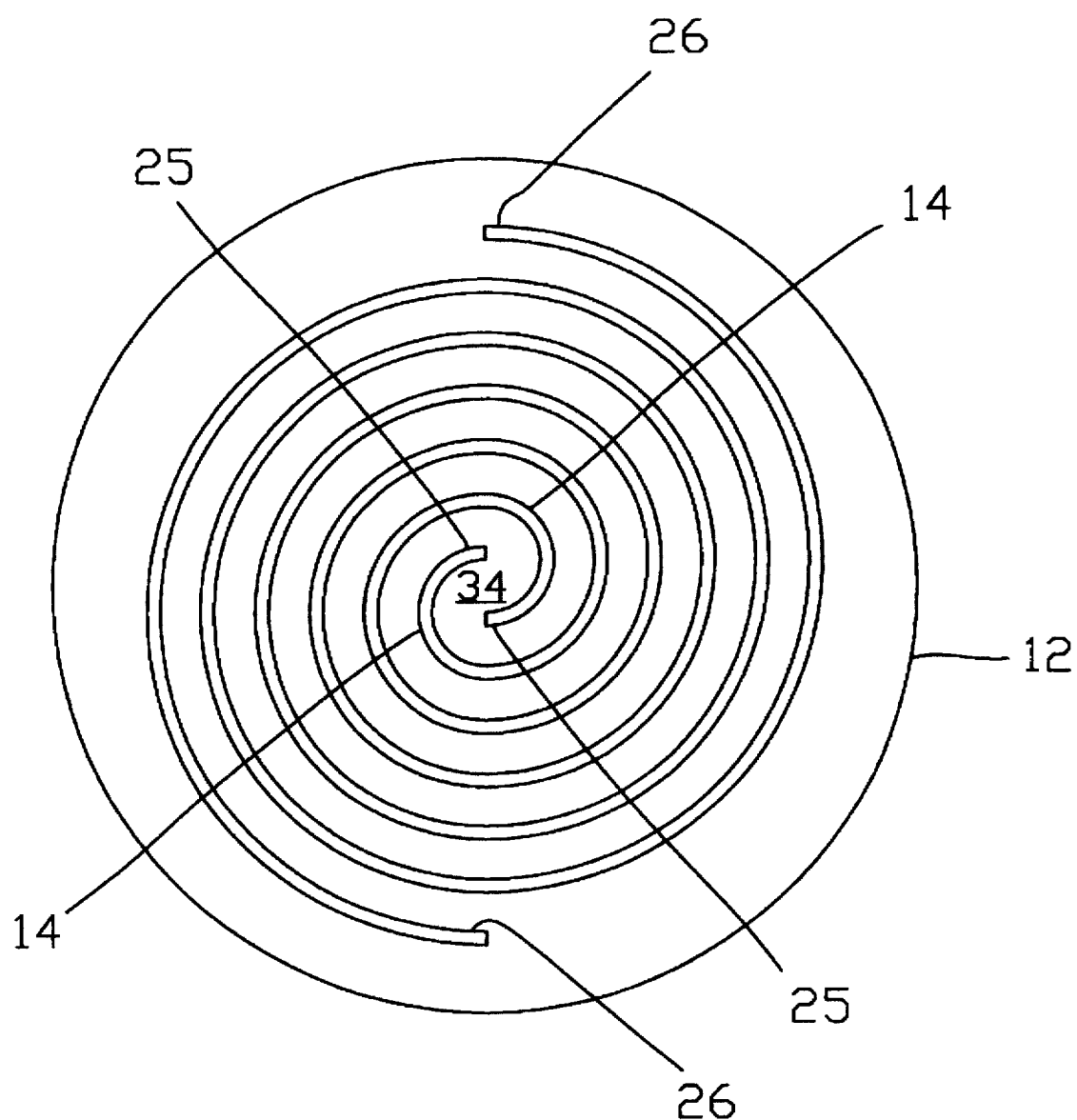
FIGS. 3-5 are illustrations of the spiral platform used in various multiple combinations.
Figure 4:
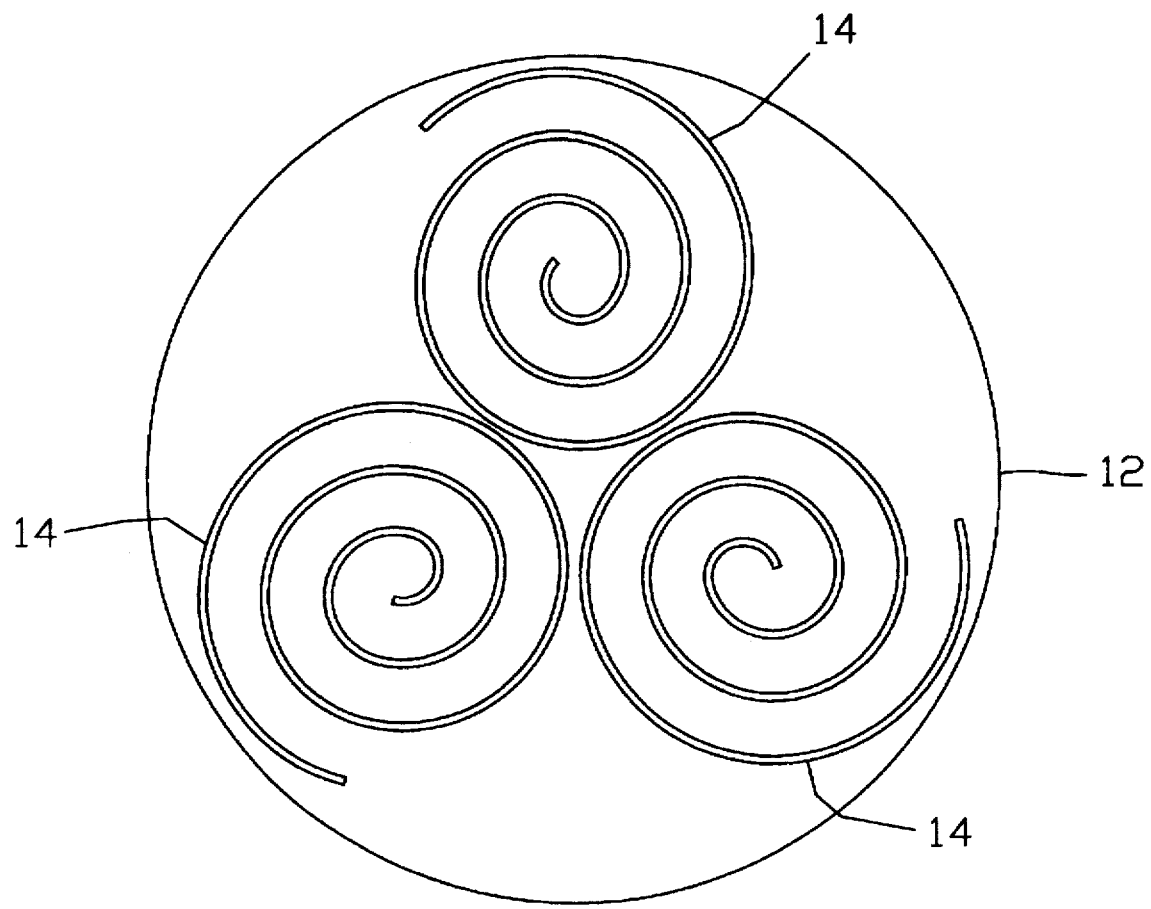
Figure 5:
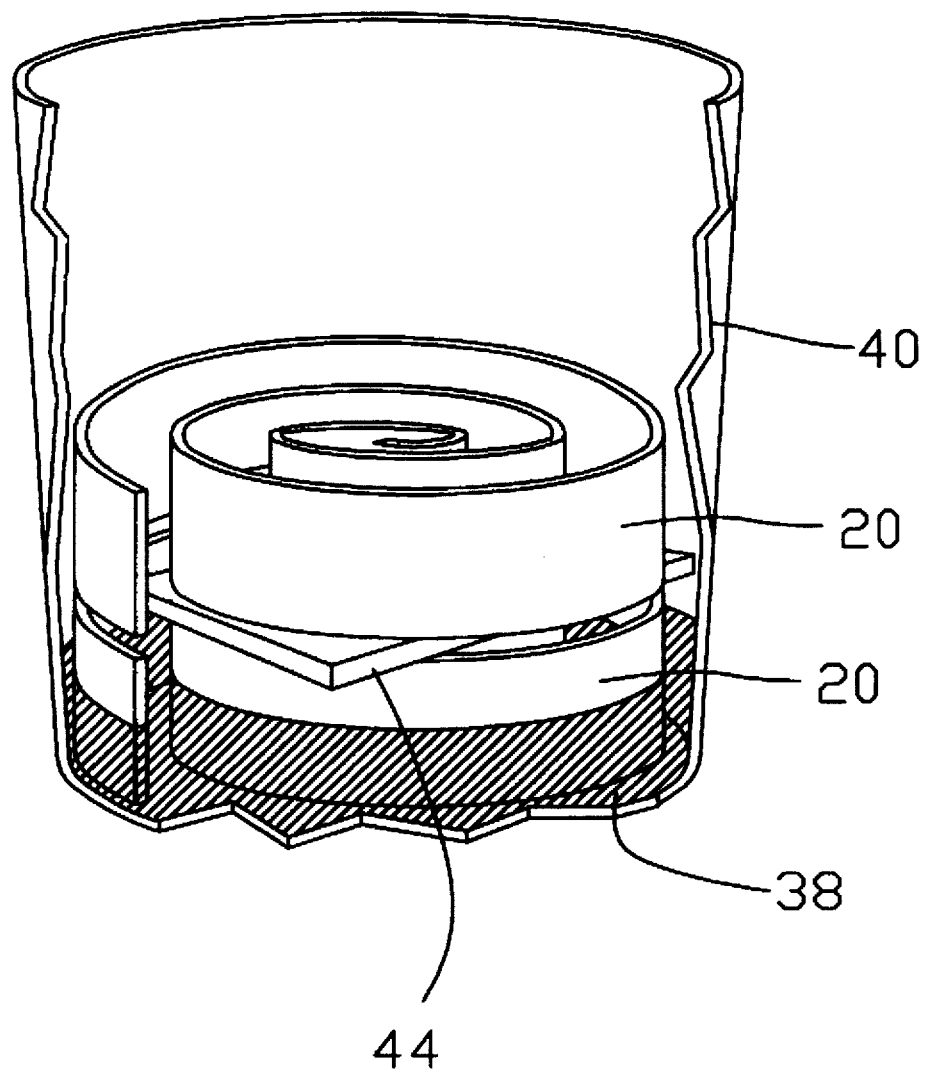

One should appreciate that due to the spring loaded characteristics of the spiral platform, strip 20 when dropped into the bottom 38 of container 12 will self adjust to the size of the particular container 12, the outer end 26 of strip 20 being biased against the side wall 40. Not only is the spiral platform reusable in containers of the same size, but also in larger containers. In addition, owing to the nature of the spiral, one or more spiral platforms may be placed inside one another to optimize packaging or to increase the load carrying capacity of the spiral platform(s) in a horizontal plane (FIG. 3). In large containers, it may be preferable to use multiple spiral platforms placed adjacent one another (FIG. 4). In similar fashion, spiral platform(s) are stackable with one another, there being a flat plate 44 sandwiched between each spiral platform to lend increased support in the vertical plane (FIG. 5).

In use, one lifts the plant pot 16 to insert the wick 18 into the drainage opening 42 in plant pot such as by using a stick-like tool 43. Next, one drops the spiral platform into the container 12. Then, the plant pot 16 is placed on top of the spiral platform, the wick 18 is routed between the plant pot 16 and the pathway 32, and the system is ready for irrigation. The latter step is accomplished simply by pouring liquid, usually water, between the inside wall of the container 12 and the outside wall of the plant pot 16. The bottom 38 of container 12 is filled to a level just below the bottom of plant pot 16.

Figure 6:
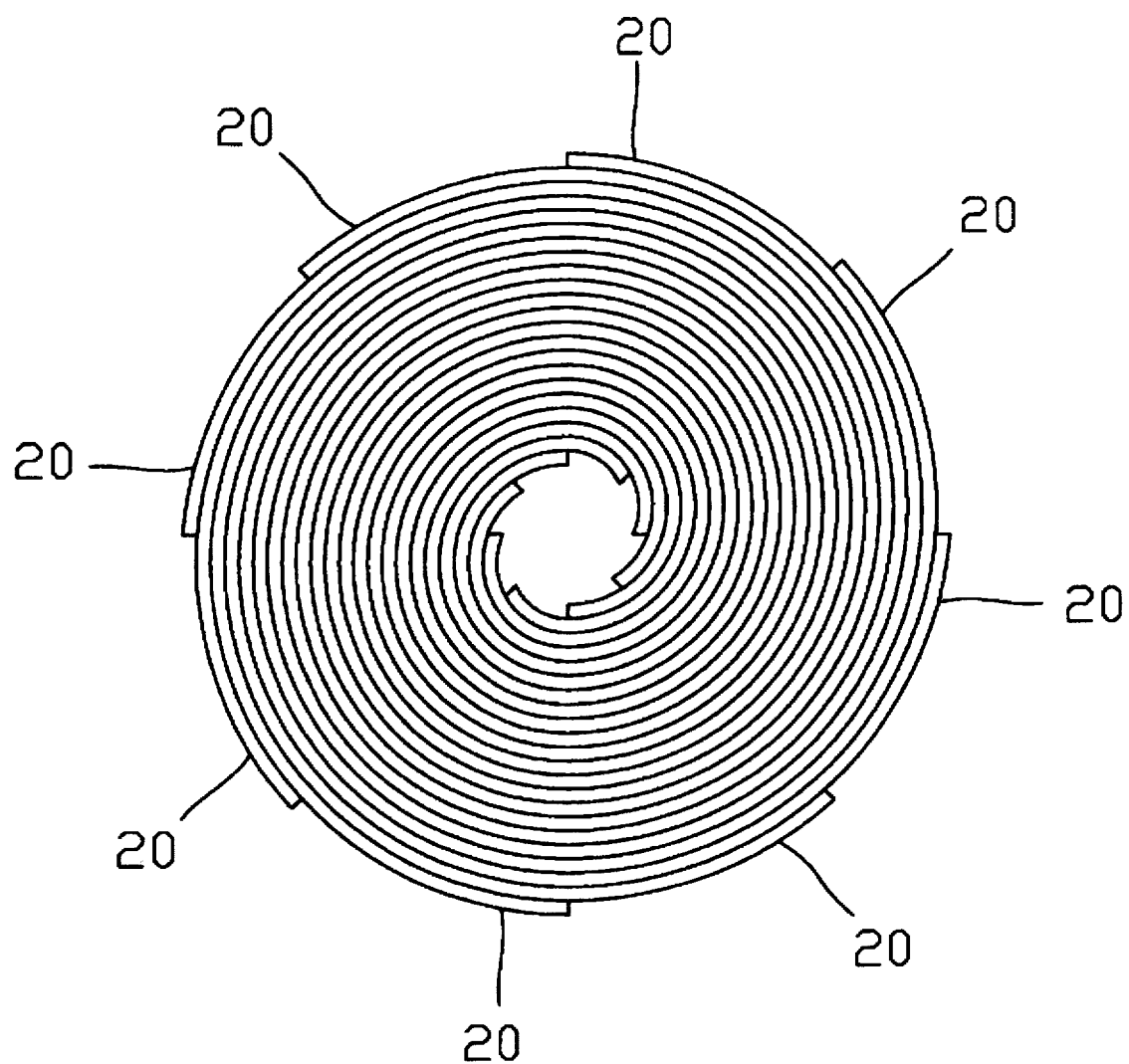
FIG. 6 is an illustration of the packaging of spiral platforms.

Removal of system 10 requires no tools. Simply lift the plant pot 16, pull out the wick 18, remove the spiral platform, and replace the plant pot 16 in the container 12. If multiple systems are being removed, the spiral platforms can be repackaged utilizing a standard box. The repackaging is done by placing each spiral platform inside another as shown in FIG. 6. Approximately ten spiral platforms can be placed inside each other before the overall diameter of the collective spiral platform increases. If one uses a typical 10"×10"×6" high box, approximately 60 one inch high spiral platforms can be packed in this space. This serves to simplify and condense repackaging, handling and storage.

Figure 7:
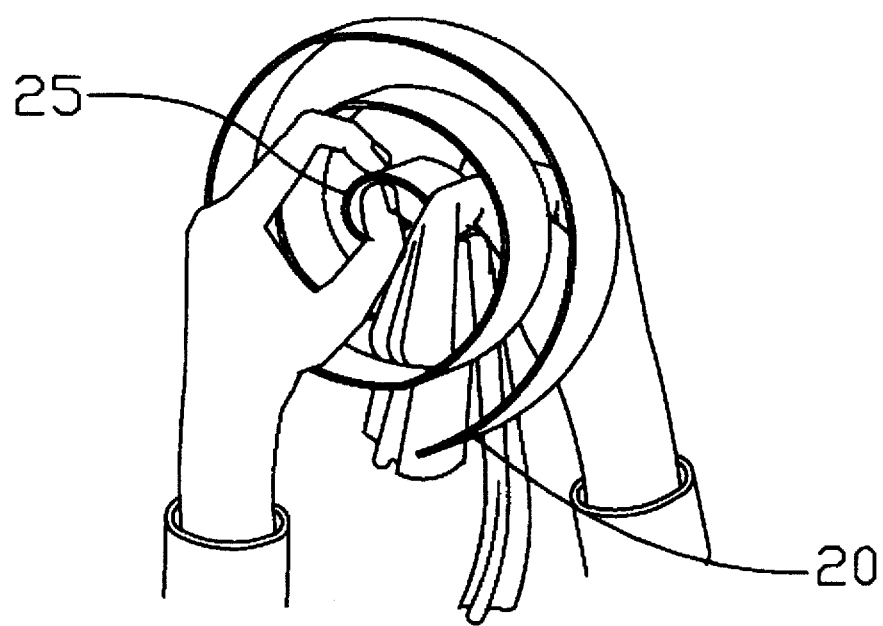
FIGS. 7 and 8 show the manner in which the spiral platforms may be cleaned.
Figure 8:
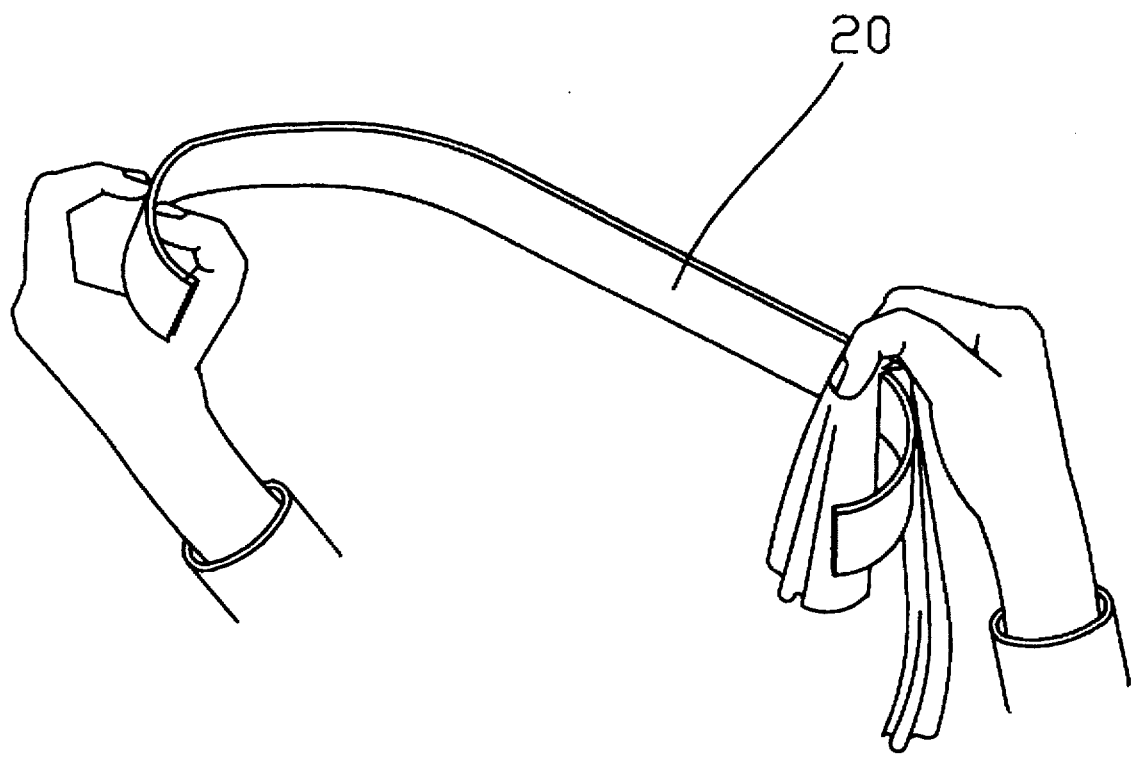

The system 10 can be reused after cleaning. At some point, the spiral platform may accumulate unwanted debris that cause odors. Simply remove the spiral platform from the system 10 at which point the outside bottom of the plant pot 16 and the bottom 38 of container 12 may be cleaned. The spiral platform can be cleaned as illustrated in FIGS. 7 and 8. First, the spiral platform is held with the left hand near the inner end 25 with the thumb and index finger. After covering the right hand with a cleaning cloth, place the right hand's thumb and index finger next to the left hand's thumb and index finger. Hold the spiral platform in place while firmly gripping the spiral platform with the left hand. Applying pressure to the spiral platform with the right hand index finger and thumb, pull the right hand away from the left hand. The spiral platform flexes while the sliding action of the right hand with the cloth wipes away any growth. The steps are repeated until the spiral platform is adequately clean. The use of a mild detergent is approved if the spiral platform is thoroughly rinsed in clean water before reuse.

In the preferred embodiment, the overall radius of the spiral platform is not limited but is typically three inches from outer end 26 to inner end 25. This is a dimension which allows the spiral platform to be used in container 12 from a diameter of typically ten inches to a diameter of four inches. The spiral can be reshaped by hand, by bending the spiral to increase the outer diameter. As before mentioned, the spiral platform is utilized in multiples in heavier plant pots 16 and larger containers 12. The thickness between inner face 28 and outer face 30 is typically but not limited to 0.0625 inches to 0.125 inches. The height from upper linear edge 22 to lower linear edge 24 is typically but not limited to one to two inches.

It should now be understood that the system 10 can be used to support plant pots 16 inside decorative containers 12 quickly, easily and conveniently. The spiral platform serves to create a reservoir that allows irrigation to be monitored and maintained. System 10 provides a platform which is compact and lightweight, yet durable and fully supportive. Unlike the prior art, the spiral platform is self-adjusting, and requires no assembly. Because of the continuous shape of the spiral, there are no crevices for unwanted debris to deposit. Installation time is significantly reduced along with shipping and handling costs.

While the invention has been described with reference to a preferred embodiment, those skilled in the art will appreciate that certain substitutions, alterations, and omissions may be made without departing from the spirit thereof. For example, the spiral platform may have a circular, square, triangular or any other shaped center with a spiral formation for the remainder of the platform and still perform adequately. Accordingly the foregoing description is meant to be exemplary only, and should not be deemed limitative on the scope of the invention set forth in the following claims.

What is claimed is:

1. An apparatus for supporting and irrigating a plant pot having a bottom and a side wall for holding a soil-based live plant, said apparatus comprising:

a container having a bottom and at least one side wall for retaining a liquid;

a free-standing support formed by a singular, generally rectangular strip of flexible, curlable material constructed and arranged to define a spiral platform disposed within said bottom and said side wall of the container and lying between said bottom of said container and said bottom of said plant pot, said strip having an inner end and an outer end, said spiral platform creating a circular pathway emanating from an open center site adjacent said inner end of said strip and flowing past an outlet site adjacent said outer end of said strip, said outer end of said strip being engagable against said bottom and said side wall of said container; and a wick extending from said pathway to transfer liquid by capillary action to said plant pot when said container is filled with liquid.

2. The apparatus of claim 1, wherein said strip has an elongated upper edge and an elongated lower edge lying substantially parallel to said upper edge, said upper edge being in contact with said bottom of said plant pot and said lower edge being in contact with said bottom of said container.

3. The apparatus of claim 1, wherein said strip is comprised of a non-fracturing, plastic material.

4. The apparatus of claim 1, wherein said strip is spring-loaded.

5. The apparatus of claim 1, wherein said strip is self-adjusting within said bottom and said side wall of said container.

6. The apparatus of claim 1, wherein said spiral platform is stackable with at least one other spiral platform.

7. The apparatus of claim 1, wherein said spiral platform is disposed within at least one other spiral platform.

8. The apparatus of claim 1, wherein said spiral platform is expandable to fit containers larger than said containers.

9. The apparatus of claim 1, wherein said outer end is biased against side wall.

10. The apparatus of claim 1, wherein the radius of said circular pathway continuously increases from said inner end to said outer end.

11. A free-standing support for a plant-pot having an open top, a bottom and a side wall, said support comprising:

a singular, generally rectangular, elongated strip of flexible, curlable, capable of being freely expandable and compressible in the direction of said spiral and material having an upper linear edge, a lower linear edge substantially parallel to said upper linear edge, a first free end, a second free end substantially parallel to said first end, an inner face and an outer face, said strip being constructed and arranged to define a spiral platform capable of supporting said bottom of said plant pot on said upper linear edge of said strip and a flat plate interposed between said upper linear edge of said strip and said bottom of said plant pot.

12. The support of claim 11, wherein said strip is comprised of a material selected from the group comprising acronitrile butadiene styrene, polyvinyl chloride, polypropylene and polyethylene.

13. The support of claim 11, wherein said strip is impervious to liquid.

14. A method for supporting and irrigating a plant pot having a bottom, and a side wall for holding a soil-based plant, said method comprising the steps of:

a) providing a container having a bottom and at least one side wall for retaining a plant maintaining liquid;

b) providing an elongated, generally rectangular strip of flexible material having an inner and an outer end;

c) heating and curling said strip to form a spiral platform of coiled construction capable of supporting said plant pot, and spiral platform creating a pathway emanating from an open center site adjacent said inner end of said strip and flowing past an outlet site adjacent said outer end of said strip;

d) placing said spiral platform against said bottom and said side wall of said container, said spiral platform self adjusting to the size of said container by virtue of said coiled construction;

e) placing said plant pot upon said spiral platform;

f) supplying said plant maintaining liquid in said container such that said liquid is spread out along said bottom of said container and along said pathway; and g) extending a wick from said pathway to transfer said plant maintaining liquid by capillary action to said plant pot.

15. A free-standing support for a plant pot having an open top, a bottom and a side wall, said support comprising:

a singular, generally rectangular, elongated strip of flexible, curlable material having an upper linear edge, a lower linear edge substantially parallel to said upper linear edge, a free inner end, a free outer end substantially parallel to said free inner end, an inner face and an outer face, said strip being constructed and arranged to define a crevice-free, spiral platform capable of supporting said bottom of said plant pot on said upper linear edge of said strip, said free inner end and said free outer end enabling said spiral platform to be placed inside another said spiral platform and enabling said inner face and said outer face to be completely cleaned along the entire length therebetween.

* * * * *

UNITED STATES PATENT AND TRADEMARK OFFICE
CERTIFICATE OF CORRECTION

PATENT NO. :5,722,201
DATED :Mar. 3, 1998
INVENTOR(S) :James J. Diorio

It is certified that error appears in the above-identified patent and that said Letters Patent is hereby corrected as shown below:

On title page, item [19] should read --DiOrio et al.--
              item [76] should read --James J. DiOrio--

Signed and Sealed this

Second Day of June, 1998

*Attest:*

BRUCE LEHMAN

*Attesting Officer*      *Commissioner of Patents and Trademarks*